W. G. DINGLE & F. J. HAMILTON.
GAS GENERATOR FOR FUMIGATING APPARATUS.
APPLICATION FILED JULY 31, 1912.
1,066,001.
Patented July 1, 1913.
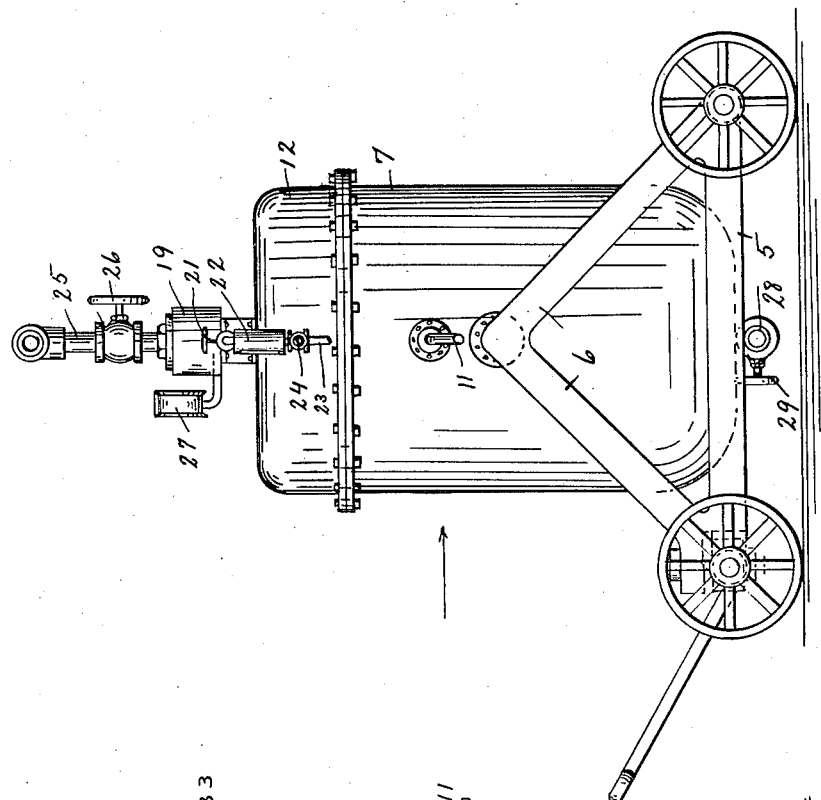
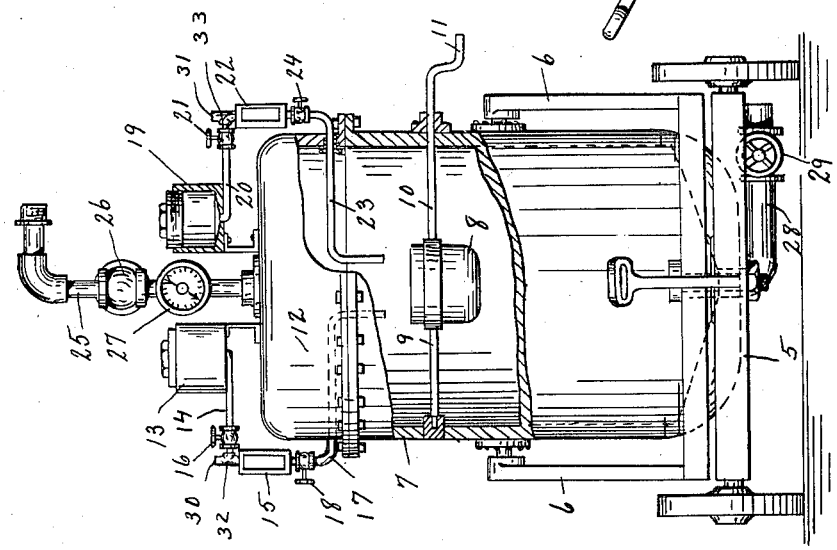
Witnesses.
Frank Waterfield
Inventors.
William G. Dingle.
Forrest J. Hamilton.
by
Attorney.

UNITED STATES PATENT OFFICE.

WILLIAM G. DINGLE AND FORREST J. HAMILTON, OF LOS ANGELES, CALIFORNIA.

GAS-GENERATOR FOR FUMIGATING APPARATUS.

1,066,001.  Specification of Letters Patent.  Patented July 1, 1913.

Application filed July 31, 1912. Serial No. 712,552.

*To all whom it may concern:*

Be it known that we, WILLIAM G. DINGLE and FORREST J. HAMILTON, citizens of the United States, residing at the city of Los Angeles, in the county of Los Angeles and State of California, have invented new and useful Improvements in Gas-Generators for Fumigating Apparatus, of which the following is a specification.

Our invention relates primarily to gas generators for citrus tree fumigating but may be applied to other plants besides citrus trees.

The method now in common use in fumigating citrus trees is to provide a tent which is spread over the tree. Then to place an earthenware receptacle under the tree thus inclosed and to place therein certain quantities of water and sulfuric acid, then to drop into the acid and water a given quantity of cyanid of potassium and then to get out quickly from under the tent. In this process there is caused a violent ebullition in the receptacle and it frequently happens that some of the liquid contents of the receptacle is blown out of the same and into contact with the foliage of the tree and with the walls of the tent thereby destroying the foliage and burning holes in the tent. After a given length of time has elapsed the tent is removed from the tree and the contents of the receptacle dumped on the ground. Frequently minute globules of acid are in the residuum and sink into the earth and damage the tree roots and particles of potassium cyanid lie upon the earth and are eaten by birds and if in the neighborhood of the farm house are eaten by domestic fowls thereby causing their death.

It is the object of our invention to produce a simple, portable apparatus in which the hydrocyanic acid gas can be generated and then conveyed under the tent on the tree thereby avoiding all danger of burning the foliage or the tent, and in which the residuum will be retained in a container until the work of fumigating the orchard or a given part thereof has been done, when the residuum can be dumped in some place where there is no danger of birds or fowls having access thereto and where the residuum can be treated if desired to recover its byproducts.

A further object is to produce an apparatus in which a given quantity of hydrocyanic acid gas can be manufactured and drawn off for liquefaction and subsequent use for tree or other fumigation.

We accomplish these objects by the apparatus described herein and illustrated in the accompanying drawings forming a part hereof in which:

Figure 1 is a side elevation. Fig. 2 is an end elevation partly in section.

In the drawings 5 is a truck in the side frame 6 of which is mounted the container 7 which is preferably provided in the lower portion with an acid resistant lining (not shown). The container is preferably mounted pivotally to expedite cleaning when necessary. Within the container is a mixing pot 8 which is provided with trunnions 9 and 10. Trunnion 10 extends through the side of the container and its outer end is bent to form an operating handle 11 so as to be able to turn the mixing pot upside down as hereinafter explained. The cover 12 of the container is removably secured to the body to facilitate cleaning the container.

Upon the cover of the container is mounted an acid receptacle 13 which is connected by pipe 14 with a graduate chamber 15 the walls of which are preferably of glass having a scale (not shown) marked thereon. A cock 16 on pipe 14 is opened or closed to open or close communication between the receptacle and chamber. Leading from the bottom of the graduate chamber and extending through the cover and into the container is the discharge pipe 17 having a cock 18 thereon. The inner end of pipe 17 terminates above pot 8 so as to discharge therein the acid that flows therethrough. A water and potassium cyanid receptacle 19 is also mounted on the cover of the container. A pipe 20 having a cock 21 thereon connects receptacle 19 with a graduate chamber 22 the walls of which are preferably of glass having a scale (not shown) marked thereon. Leading from the bottom of chamber 22 is pipe 23 having a cock 24 thereon. This pipe extends through the container cover and terminates above pot 8 so as to discharge therein.

Leading out of the top of the container is the discharge pipe 25 having a cock 26 thereon. To the end of pipe 25 is connected the hose (not shown) which leads the gas under the tent to the tree to be fumigated when using the apparatus for fumigating one or more trees at a time. A gage 27 may be provided on pipe 25 to show the gas pressure in the container.

In the use of our apparatus for fumigating trees, a supply of acid sufficient to fumigate a certain number of trees is placed in the acid receptacle after cock 16 is closed. As much cyanid of potassium and water, well mixed together, sufficient to be used with the acid is placed in receptacle 19 after cock 21 is closed. The apparatus is then drawn to the tree to be fumigated, cocks 18 and 24 are then closed and cocks 16 and 21 opened. As soon as the required amount of acid for a tree of that size has run into the graduate chamber cock 16 is closed. At the same time the solution of water and potassium cyanid are running into the other graduate chamber and when the required amount is in the chamber cock 21 is closed and cock 24 opened. Plugs 30 and 31 in fittings 32 and 33 may be opened to facilitate the escape of the liquid from the graduate chambers. As soon as the solution runs into pot 8 cock 18 is opened and the acid is discharged into pot 8 thereby producing hydrocyanic acid gas which passes through the discharge pipe and the hose (not shown) under the tent and tree. As the gas generates very quickly, in a moment all the gas generated by the charge has passed into the tent except a small amount in the container. Cock 26 is then closed and the apparatus is drawn to another tree. The contents of pot 8 are dumped into the bottom of the container and another tree is fumigated in like manner. As the apparatus is moved from one tree to another the residuum in the bottom of the container will be shaken up so that all the potassium cyanid will be dissolved and all the acid will be used as well, and a further supply of gas generated which will pass out of the container at the next tree so that all the material is utilized. By the use of our apparatus only gas is brought into contact with the tent and tree and injury to both is thereby avoided. After the contents of receptacles 15 and 19 are utilized a new supply may be provided for other trees and the residuum dumped into the bottom of the container may be drawn out through pipe 28 which leads from the bottom thereof and is provided with a cock 29 to control the flow of material therethrough.

When the apparatus is used to make a quantity of gas for liquefaction the mixing pot would be of sufficient capacity to hold as much acid, water and salts as it was desired to manufacture at a time and the gas would be run through a condenser to liquefy it.

If desired the gas can be liquefied as it liquefies at 80 degrees Fahrenheit and can be converted into its gaseous form by a heat greater than 80 degrees Fahrenheit. A charge of liquid gas could be placed in a suitable heating apparatus and the gas led under the tree and tent. When liquefying the gas the dumping pot could be omitted and in tree fumigating the dumping pot could be omitted but the apparatus would not work quite as well as with it.

Having described our invention what we claim is:

1. A gas generator for fumigating apparatus comprising a container; a pot in said container; means to convey a solution of water and cyanid of potassium into said pot; means to convey sulfuric acid into said pot; means to invert said pot to dump the contents thereof and means to lead the gas from the container.

2. A gas generator for fumigating apparatus comprising a container; a pot in said container, said pot being revolubly mounted; means to convey a charge comprising a solution of water and cyanid of potassium into said pot; means to convey a charge of sulfuric acid into the water and potassium cyanid in the pot; means to invert said pot to dump the contents thereof; and an outlet from said container.

3. A gas generator for fumigating apparatus comprising a container; a receptacle for sulfuric acid and another receptacle for water and cyanid of potassium mounted on said container; a pot mounted in said container; means to invert said pot to dump the contents thereof; graduates exterior said container between said receptacles and said pot; pipes connecting said receptacles and said graduates; valves on said pipes; pipes extending from said graduates and discharging into said pot; valves on said last pipes; and an outlet from said container.

In witness that we claim the foregoing we have hereunto subscribed our names this 21st day of July, 1912.

WILLIAM G. DINGLE.
F. J. HAMILTON.

Witnesses:
FRANK WATERFIELD,
G. E. HARPHAM.